(12) United States Patent
Saki et al.

(10) Patent No.: US 10,381,893 B2
(45) Date of Patent: Aug. 13, 2019

(54) ROTARY ELECTRICAL MACHINE

(71) Applicant: Mitsubishi Electric Corporation, Chiyoda-ku, Tokyo (JP)

(72) Inventors: Ryoji Saki, Tokyo (JP); Yasuhiro Yokota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 287 days.

(21) Appl. No.: 15/038,558

(22) PCT Filed: Dec. 24, 2013

(86) PCT No.: PCT/JP2013/084512
§ 371 (c)(1),
(2) Date: May 23, 2016

(87) PCT Pub. No.: WO2015/097753
PCT Pub. Date: Jul. 2, 2015

(65) Prior Publication Data
US 2016/0301276 A1     Oct. 13, 2016

(51) Int. Cl.
*H02K 1/14* (2006.01)
*H02K 3/52* (2006.01)
(Continued)

(52) U.S. Cl.
CPC .............. *H02K 3/522* (2013.01); *H02K 1/14* (2013.01); *H02K 5/08* (2013.01); *H02K 1/148* (2013.01);
(Continued)

(58) Field of Classification Search
CPC .............................. H02K 5/08; H02K 2203/06
(Continued)

(56) References Cited

U.S. PATENT DOCUMENTS

| 5,729,072 A * | 3/1998 | Hirano | H02K 1/148 |
| | | | 310/179 |
| 2007/0170792 A1* | 7/2007 | Bott | H02K 3/522 |
| | | | 310/71 |

(Continued)

FOREIGN PATENT DOCUMENTS

| CN | 1265528 C | 7/2006 |
| JP | S 61227648 | * 10/1986 |

(Continued)

OTHER PUBLICATIONS

Communication dated Jun. 21, 2017, from European Patent Office in counterpart application No. 13900098.8.

(Continued)

*Primary Examiner* — Quyen P Leung
*Assistant Examiner* — Ahmed Elnakib
(74) *Attorney, Agent, or Firm* — Sughrue Mion, PLLC; Richard C. Turner (57) ABSTRACT

A rotary electric machine according to the present invention includes: a rotor; a stator that includes: an annular stator core that is disposed so as to surround the rotor; and a plurality of concentrated winding coils that are wound onto the stator core; a holder that includes an annular holder portion in which a groove is formed on one surface so as to extend circumferentially, the holder being disposed on a first axial end of the stator such that a second surface of the holder portion is oriented toward the stator; and a plurality of connecting terminals that are held by the holder, coil terminals of the plurality of concentrated winding coils each extending outward from the concentrated winding coils, being led around circumferentially through the groove, and being connected to connecting terminals that are subject to connection therewith.

5 Claims, 6 Drawing Sheets

(51) Int. Cl.
 *H02K 5/08* (2006.01)
 *H02K 5/22* (2006.01)
(52) U.S. Cl.
 CPC ......... *H02K 5/225* (2013.01); *H02K 2203/03* (2013.01); *H02K 2203/06* (2013.01)
(58) Field of Classification Search
 USPC .................................................. 310/71, 43
 See application file for complete search history.

(56) References Cited

U.S. PATENT DOCUMENTS

2010/0201213 A1* 8/2010 Kataoka ................ H02K 3/522
 310/71
2012/0286593 A1 11/2012 Yokogawa et al.

FOREIGN PATENT DOCUMENTS

| JP | 2002-78272 A | 3/2002 |
| JP | 2003-324883 A | 11/2003 |
| JP | 2004-120910 A | 4/2004 |
| JP | 3613262 B2 | 1/2005 |
| JP | 2009-118635 A | 5/2009 |
| JP | 2009118635 | * 5/2009 |

OTHER PUBLICATIONS

International Search Report for PCT/JP2013/084512 dated Apr. 8, 2014.
Communication dated Nov. 1, 2017, from State Intellectual Property Office of the P.R.C. in counterpart application No. 201380081874.8.

* cited by examiner

ROTARY ELECTRICAL MACHINE

CROSS REFERENCE TO RELATED APPLICATIONS

This application is a National Stage of International Application No. PCT/JP2013/084512 filed Dec. 24, 2013, the contents of which are incorporated herein by reference in its entirety.

TECHNICAL FIELD

The present invention relates to a rotary electric machine such as an electric motor or a generator that is mounted to an automobile or a truck, for example, and particularly relates to a connecting construction for coils that constitute part of a stator winding.

BACKGROUND ART

A first conventional rotary electric machine includes: a current-carrying member that includes a strip-shaped current-carrying portion, and that is formed by bending arm portions in a plate thickness direction of the strip-shaped current-carrying portion, the arm portions being integrated with the strip-shaped current-carrying portion and extending outward from side and end portions of this strip-shaped current-carrying portion so as to be approximately parallel to a longitudinal direction; a holder that holds this current-carrying member; and a plurality of coils that are wound, wherein the coils are connected to the arm portions (Patent Literature 1, for example).

In a second conventional rotary electric machine, a leader line that is led out from a stator winding has: an axially extended portion that is led out in an axial direction of the stator core from a coil end portion of the stator winding; a circumferentially extended portion that is made to slink around parallel to the coil end portions from the axially extended portion; and a radially extended portion that extends radially outward from the circumferentially extended portion, the circumferentially extended portion being fixed by gluing to the coil end portions using a resin material (see Patent Literature 2, for example).

CITATION LIST

Patent Literature

Patent Literature 1: Japanese Patent No. 3613262 (Gazette)
Patent Literature 2: Japanese Patent No. 4581479 (Gazette)

SUMMARY OF THE INVENTION

Problem to be Solved by the Invention

In the first conventional rotary electric machine, one problem has been that separate current-carrying members for coil connection are required, making reductions in cost unachievable.

On the other hand, in the second conventional rotary electric machine, members such as current-carrying members are no longer necessary, but one problem has been that an operation to fix the circumferentially extended portions of the leader lines to the coil end portions using a resin material is required, reducing productivity.

The present invention aims to solve the above problems and an object of the present invention is to provide a rotary electric machine that enables reductions in cost, and also enables productivity to be improved, by eliminating need for separate current-carrying members for coil connection and for an operation of gluing and coil terminals.

Means for Solving the Problem

A rotary electric machine according to the present invention includes: a rotor; a stator that includes: an annular stator core that is disposed so as to surround the rotor; and a plurality of coils that are wound onto the stator core; an insulating member that includes an annular holder portion in which a groove is formed on one surface so as to extend circumferentially, the insulating member being disposed on a first axial end of the stator such that a second surface of the holder portion is oriented toward the stator; and a plurality of connecting terminals that are held by the insulating member. Coil terminals of the plurality of coils each extend outward from the coils, are led around circumferentially through the groove, and are connected to connecting terminals that are subject to connection therewith among the plurality of connecting terminals.

Effects of the Invention

Because the coil terminals extend outward from the coils, are led around circumferentially through the groove that is formed on the holder portion, and are connected to connecting terminals that are subject to connection therewith, portions of the coil terminals that are led around circumferentially are held by the holder portion. Thus, it is not necessary to hold separate current-carrying members for coil connection inside the groove of the holder portion, and complicated operations for fixing portions of the coil terminals that are led circumferentially around to the coil ends by gluing are no longer required, enabling reductions in cost to be achieved, and also improving productivity.

DESCRIPTION OF EMBODIMENTS

Embodiment 1

Figure 1:
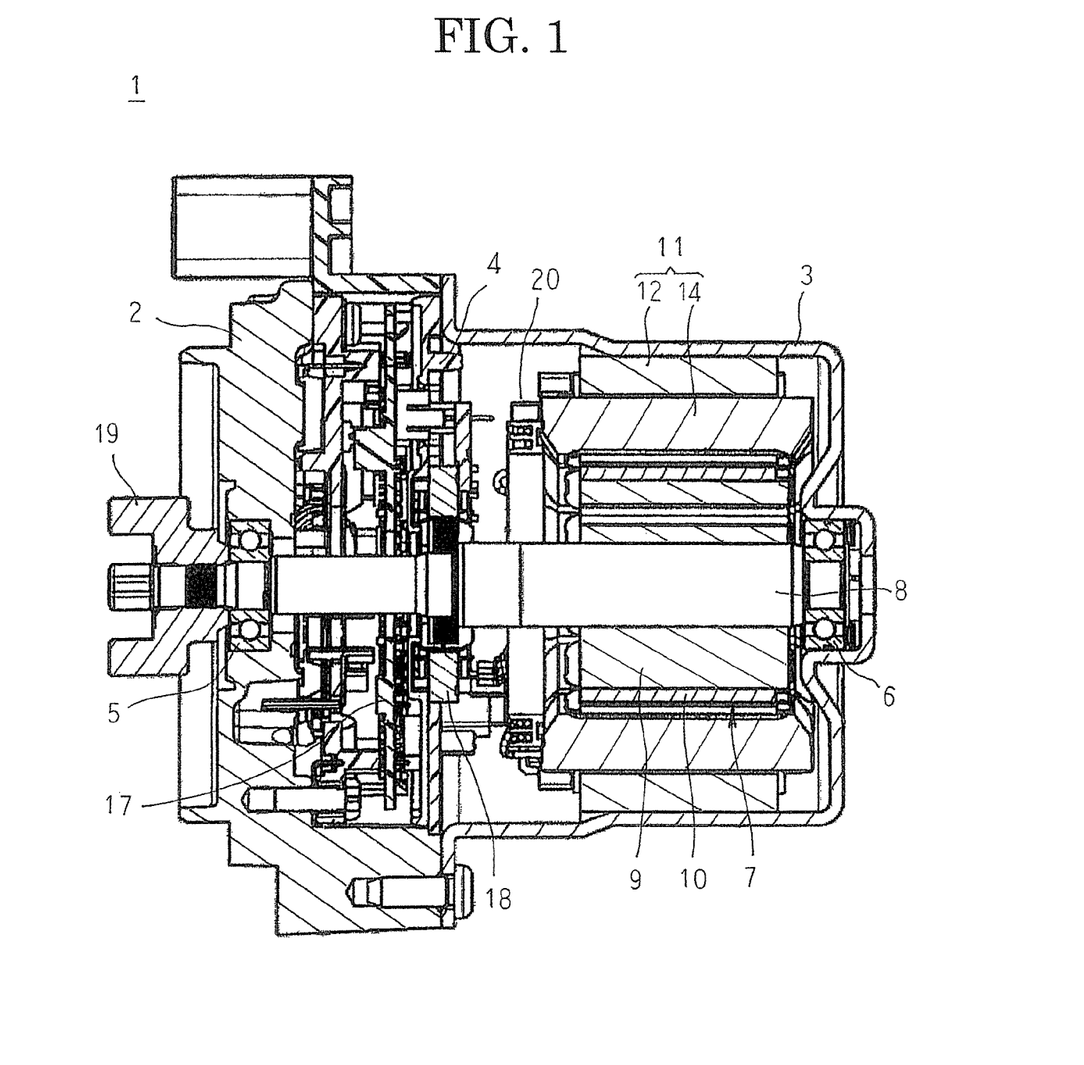
FIG. 1 is a longitudinal cross section that shows a control apparatus-integrated electric motor according to Embodiment 1 of the present invention.
Figure 2:
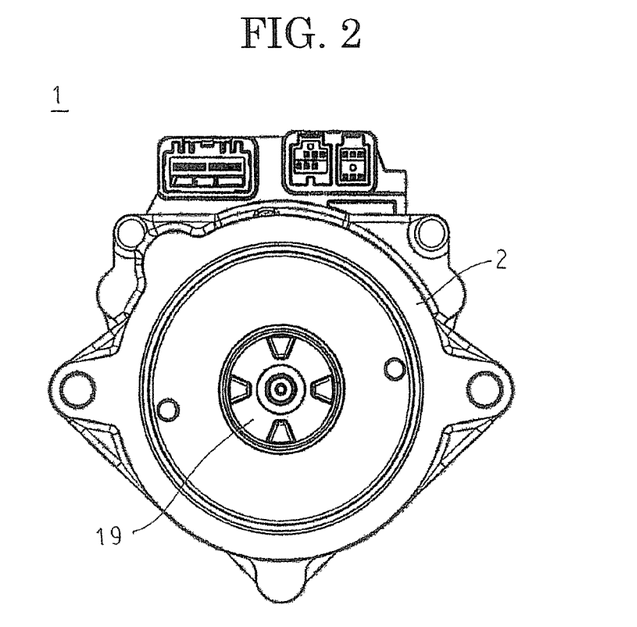
FIG. 2 is an end elevation that shows a control apparatus-integrated electric motor according to Embodiment 1 of the present invention.
Figure 3:
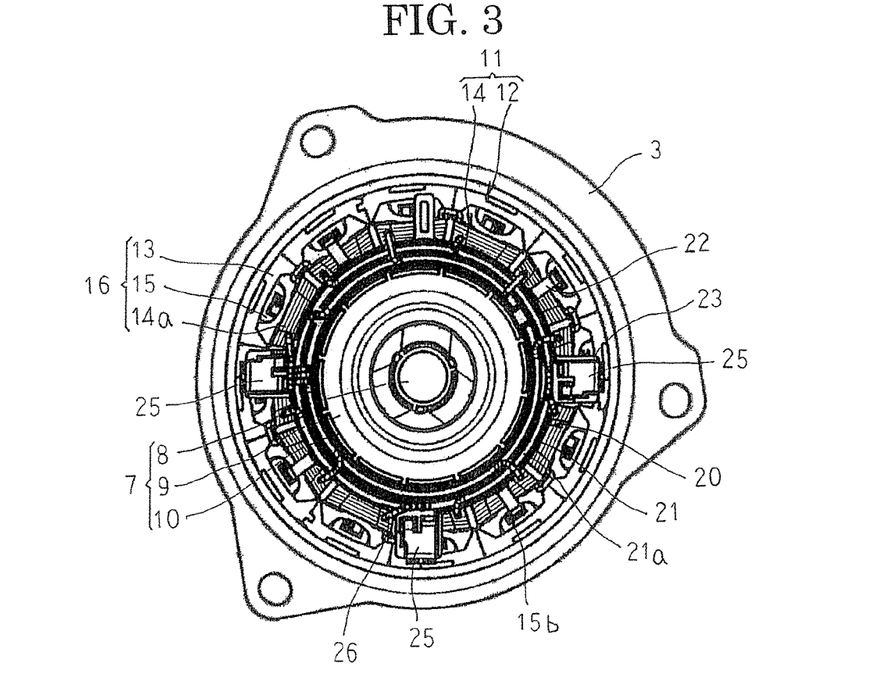
FIG. 3 is an end elevation that shows a state in the which a housing is removed from the control apparatus-integrated electric motor according to Embodiment 1 of the present invention.
Figure 4:
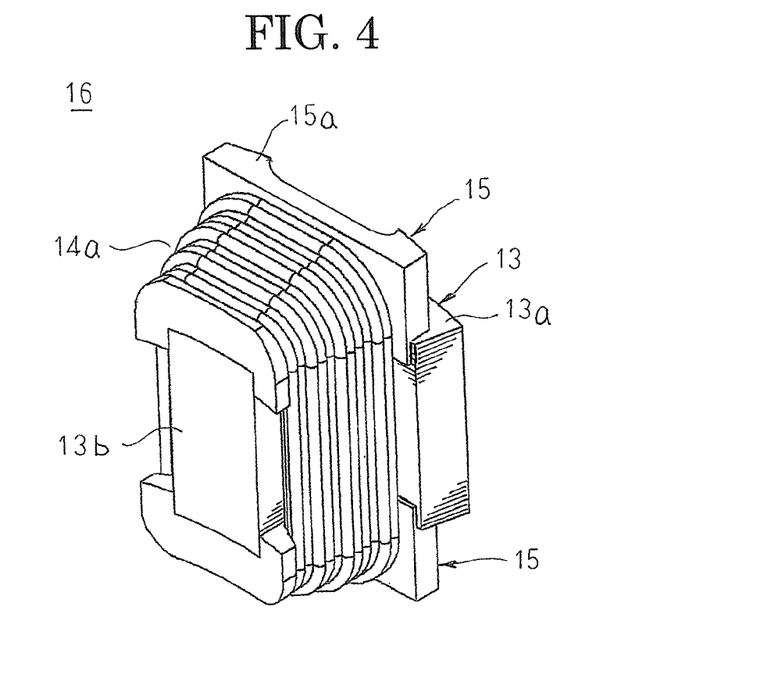
FIG. 4 is an oblique projection that shows a coil assembly in the control apparatus-integrated electric motor according to Embodiment 1 of the present invention.
Figure 5:
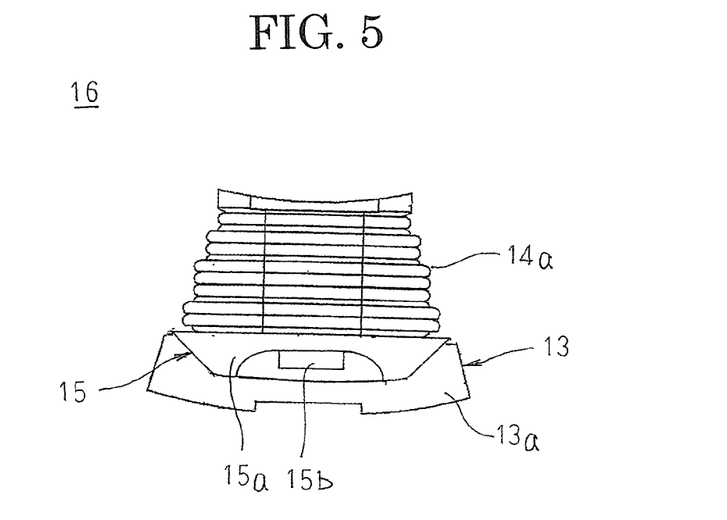
FIG. 5 is an end elevation that shows a coil assembly in the control apparatus-integrated electric motor according to Embodiment 1 of the present invention.
Figure 6:
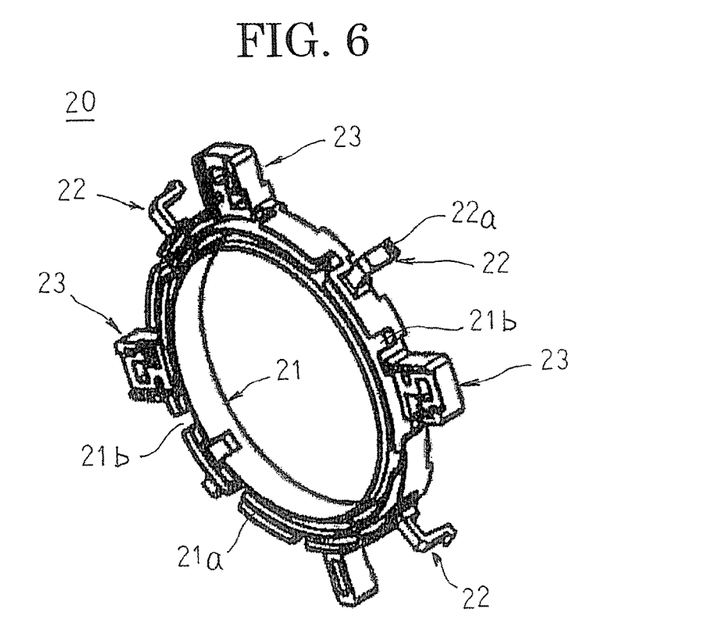
FIG. 6 is an oblique projection that shows a holder in the control apparatus-integrated electric motor according to Embodiment 1 of the present invention.
Figure 7:
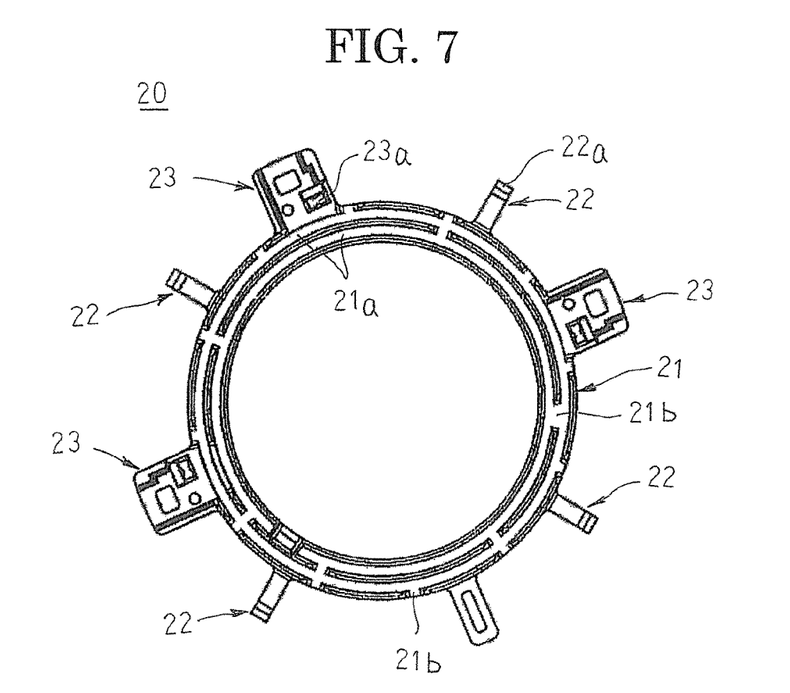
FIG. 7 is a plan that shows the holder in the control apparatus-integrated electric motor according to Embodiment 1 of the present invention.
Figure 8:
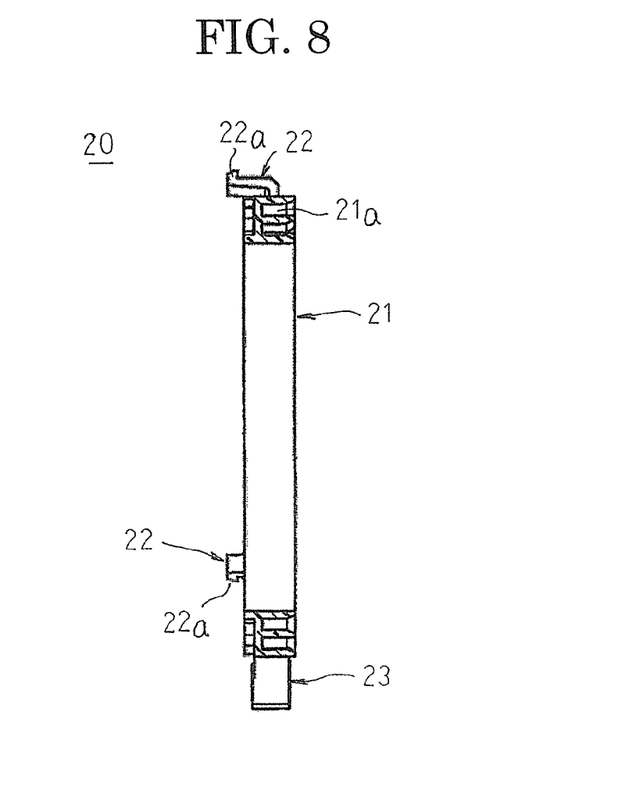
FIG. 8 is a cross section that shows the holder in the control apparatus-integrated electric motor according to Embodiment 1 of the present invention.
Figure 9:
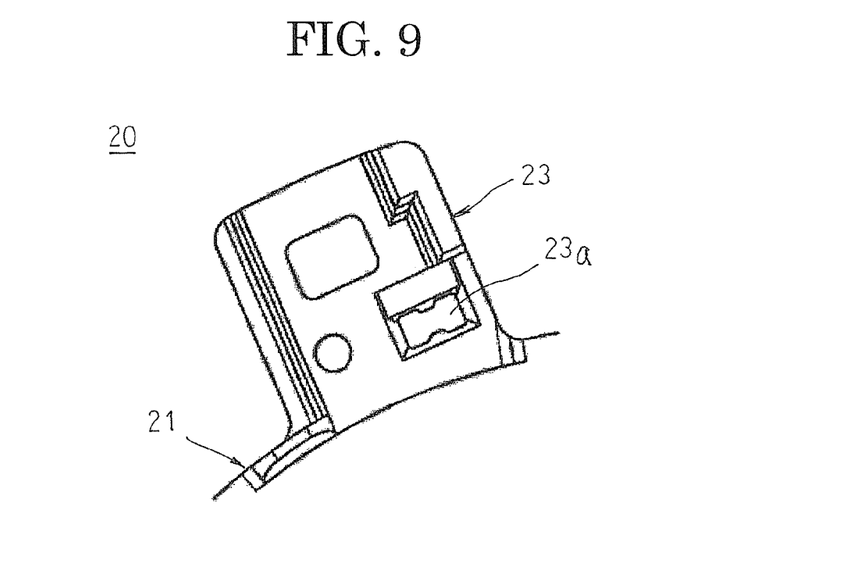
FIG. 9 is a partial plan that shows the holder in the control apparatus-integrated electric motor according to Embodiment 1 of the present invention.
Figure 10:
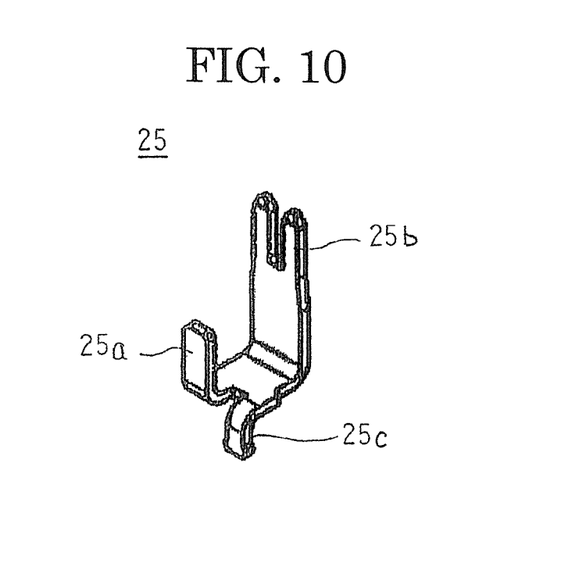
FIG. 10 is an oblique projection that shows a connecting terminal in the control apparatus-integrated electric motor according to Embodiment 1 of the present invention.
Figure 11:
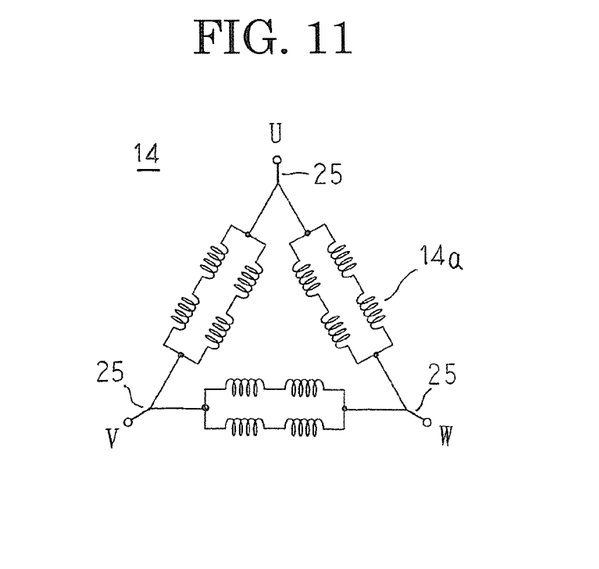
FIG. 11 is a connection diagram for a stator winding in the control apparatus-integrated electric motor according to Embodiment 1 of the present invention.

FIG. 1 is a longitudinal cross section that shows a control apparatus-integrated electric motor according to Embodiment 1 of the present invention, FIG. 2 is an end elevation that shows a control apparatus-integrated electric motor according to Embodiment 1 of the present invention, FIG. 3 is an end elevation that shows a state in the which a housing is removed from the control apparatus-integrated electric motor according to Embodiment 1 of the present invention, FIG. 4 is an oblique projection that shows a coil assembly in the control apparatus-integrated electric motor according to Embodiment 1 of the present invention, FIG. 5 is an end elevation that shows a coil assembly in the control apparatus-integrated electric motor according to Embodiment 1 of the present invention, FIG. 6 is an oblique projection that shows a holder in the control apparatus-integrated electric motor according to Embodiment 1 of the present invention, FIG. 7 is a plan that shows the holder in the control apparatus-integrated electric motor according to Embodiment 1 of the present invention, FIG. 8 is a cross section that shows the holder in the control apparatus-integrated electric motor according to Embodiment 1 of the present invention, FIG. 9 is a partial plan that shows the holder in the control apparatus-integrated electric motor according to Embodiment 1 of the present invention, FIG. 10 is an oblique projection that shows a connecting terminal in the control apparatus-integrated electric motor according to Embodiment 1 of the present invention, and FIG. 11 is a connection diagram for a stator winding in the control apparatus-integrated electric motor according to Embodiment 1 of the present invention.

In FIGS. 1 through 3, a control apparatus-integrated electric motor 1 that functions as a rotary electric machine includes: a housing 2 that is produced using aluminum, for example; a frame 3 that is produced into a floored cylindrical shape by drawing a steel plate, for example; and a partitioning wall 4 that is made of a resin, that is disposed between the housing 2 and the frame 3. A control apparatus housing space is formed between the housing 2 and the partitioning wall 4, and a motor portion housing space is formed between the frame 3 and the partitioning wall 4.

The control apparatus-integrated electric motor 1 further includes: a rotor 7 that is fixed to the shaft 8 so as to be rotatably disposed inside the motor housing space; a stator 11 that is held by the frame 3 so as to surround the rotor 7, and that is disposed inside the motor housing space so as to be coaxial to the rotor 7; a control circuit board 17 that is disposed inside the control apparatus housing space; a resolver 18 that detects a rotational angle of the rotor 7; and a boss portion 19 that is fixed to a portion of the shaft 8 that protrudes from the housing 2, and that is linked to an electric power steering apparatus (not shown). A controlling circuit that controls driving of a DC-AC power converting portion (not shown) to convert direct-current power from outside into alternating-current power, and that supplies the latter to the stator winding 14, is mounted to the control circuit board 17.

The rotor 7 includes: a shaft 8 that is supported by a housing-end bearing 5 that is held at a central position of the housing 2 and a frame-end bearing 6 that is held at a central position of a bottom portion of the frame 3 so as to pass through the partitioning wall 4; a rotor core 9 that is fixed to the shaft 8 so as to be rotatably disposed inside the motor housing space; and permanent magnets 10 that are fixed by adhesive so as to be arranged on an outer circumferential surface of the rotor core 9 at a uniform angular pitch circumferentially. The permanent magnets 10 are disposed so as to line up such that North-seeking (N) poles and South-seeking (S) poles alternate circumferentially. In addition, a protective tube (not shown) is coated onto an outer circumferential surface of the rotor core 9 on which the permanent magnets 10 are disposed.

The stator 11 includes: an annular stator core 12; and a stator winding 14 that is mounted to the stator core 12.

The stator core 12, as shown in FIGS. 4 and 5, includes core blocks 13 that have: a circular arc-shaped core back portion 13a; and a tooth portion 13b that protrudes radially inward from an inner circumferential wall surface of the core back portion 13a. The core blocks 13 are produced by stacking and integrating magnetic steel sheet segments that have been punched into an approximate T shape.

Insulators 15 are resin-molded bodies in which an insulating resin such as polyphenylene sulfide (PPS) resin is used, for example. Securing apertures 15b that function as securing portions are formed on flange portions 15a that protrude from an outer circumferential side of the insulators 15.

As shown in FIGS. 4 and 5, a coil assembly 16 is produced by disposing the insulators 15 on two axial end surfaces of the tooth portion 13b of the core block 13, and winding a conductor wire that is made of a jointless continuous copper wire that is coated with an enamel resin, for example, around the tooth portion 13b and the insulators 15 that are disposed on the two axial end surfaces of the tooth portion 13b a number of times. Moreover, the conductor wire is wound around the tooth portion 13b and the insulators 15 that are disposed on the two axial end surfaces of the tooth portion 13b a number of times to produce a concentrated winding coil 14a. For simplicity, only one coil assembly 16 is shown in FIGS. 4 and 5, but in reality, the single conductor wire is wound onto a first core block 13 to produce a concentrated winding coil 14a, and then subsequently wound onto a second core block 13 to produce a concentrated winding coil 14a. The concentrated winding coils 14a of the two coil assemblies 16 are thereby configured continuously using a crossover wire. Thus, although not shown, one coil terminal 26, which is a winding start or a winding finish of the concentrated winding coils 14a, is led out at a first axial end of the tooth portions 13b from each of the concentrated winding coils 14a.

As shown in FIGS. 6 through 9, a holder 20 that functions as an insulating member is a resin-molded body in which an insulating resin such as nylon, for example, is used, and has: a ring-shaped holder portion 21; four leg portions 22 that are each formed so as to protrude radially outward from the holder portion 21, and then extend in a first radial direction, and that are disposed circumferentially at an angular pitch of 90 degrees; and three terminal holding portions 23 that are each formed so as to protrude radially outward from the holder portion 21, and that are disposed circumferentially at an angular pitch of 90 degrees. Two circular grooves 21a for holding the coil terminals are formed concentrically on one surface of the holder portion 21. Notches 21*b* for passage of the coil terminals are formed so as to communicate radially between the two grooves 21*a* and between the outer groove 21*a* and a radially outer side of the holder portion 21. In addition, a fixing hook 22*a* is formed on a protruding end of each of the leg portions 22. Furthermore, a terminal holding aperture 23*a* is formed on each of the terminal holding portions 23.

As shown in FIG. 10, a connecting terminal 25 is produced by flex molding a metal plate that has good conductivity such as copper, etc., and includes: a first terminal portion 25*a* to which one of the coil terminals 26 of the concentrated winding coils 14*a* is joined; second terminal portions 25*b* to which output terminals (not shown) from the DC-AC power converting portion are joined; and a third terminal portion 25*c* that is inserted into one of the terminal holding apertures 23*a* of the terminal holding portions 23 to hold the connecting terminal 25 on the terminal holding portion 23.

In order to assemble a control apparatus-integrated electric motor 1 that is configured in this manner, twelve coil assemblies 16 are first arranged in an annular shape circumferentially by butting together circumferential side surfaces of the core back portions 13*a* of the core blocks 13, and are press-fitted into and fixed to a cylindrical portion of the frame 3, or are inserted inside and fixed to the cylindrical portion by shrinkage fitting, to mount the stator 11 to the frame 3.

Moreover, the stator core 12 is constituted by twelve core blocks 13 that are arranged into an annular shape by butting together circumferential side surfaces of the core back portions 13*a*. The stator winding 14 is formed by the twelve concentrated winding coils 14*a* that are wound onto the tooth portions 13*b* of the core blocks 13. Portions of the concentrated winding coils 14*a* that protrude axially outward from the stator core 12 constitute coil ends of the stator winding 14.

Here, among the twelve coil assemblies 16 that are arranged in an annular shape, let us assume that in order of arrangement in the circumferential direction, the concentrated winding coils 14*a* of the first and second coil assemblies 16 are configured consecutively, the concentrated winding coils 14*a* of the third and fourth coil assemblies 16 are configured consecutively, the concentrated winding coils 14*a* of the fifth and sixth coil assemblies 16 are configured consecutively, the concentrated winding coils 14*a* of the seventh and eighth coil assemblies 16 are configured consecutively, the concentrated winding coils 14*a* of the ninth and tenth coil assemblies 16 are configured consecutively, and the concentrated winding coils 14*a* of the eleventh and twelfth coil assemblies 16 are configured consecutively.

Next, as shown in FIG. 3, the holder 20 is mounted to the stator 11, which is inserted into and fixed to the frame 3, by fitting the fixing hooks 22*a* of the leg portions 22 into the securing apertures 15*b* of the insulators 15 from a side near an opening of the frame 3. The holder 20 is thereby disposed near the opening of the frame 3 of the stator 11 such that the holder portion 21 overlaps axially with a region on a radially inner side of the coil ends of the stator winding 14.

Next, each of the coil terminals 26 that are led out axially from the concentrated winding coils 14*a* is pulled inside a groove 21*a* through a notch 21*b*, and is led circumferentially along the groove 21*a* around to a vicinity of the connecting terminal 25 that is subject to connection therewith. Then, the coil terminal 26 is lead out of the groove 21*a* to be joined to the first terminal portion 25*a* of the connecting terminal 25 that is subject to connection therewith by welding, etc. The coil terminals 26 of the concentrated winding coils 14*a* that are mounted to the first, sixth, eighth, and eleventh coil assemblies 16 are connected to one of the connecting terminals 25, for example. The coil terminals 26 of the concentrated winding coils 14*a* that are mounted to the second, fourth, seventh, and ninth coil assemblies 16 are connected to another of the connecting terminals 25. The coil terminals 26 of the concentrated winding coils 14*a* that are mounted to the second, fourth, seventh, and ninth coil assemblies 16 are connected to the remaining connecting terminal 25. A stator winding 14 is thereby obtained that is formed by delta-connecting a U-phase coil, a V-phase coil, and a W-phase that are each configured by connecting four concentrated winding coils 14*a* into two series and two parallel connections, as shown in FIG. 11.

Next, a first end of the shaft 8 is fitted into the frame-end bearing 6, to install the rotor 7 inside the stator 11 that is fixed to the frame 3. The control circuit board 17, and the DC-AC power converting portion, etc., are also mounted to the housing 2. Then, the output terminals (not shown) of the DC-AC power converting portion are connected to the second terminal portions 25*b* of the connecting terminals 25, a second end of the shaft 8 is fitted into the housing-end bearing 5 so as to pass through the partitioning wall 4, and the frame 3 is fastened and fixed to the housing 2. The partitioning wall 4 is thereby disposed so as to be held between the housing 2 and the frame 3. Finally, the boss portion 19 is fixed to the end of the shaft 8 that protrudes from the housing 2, to complete assembly of the control apparatus-integrated electric motor 1.

In the control apparatus-integrated electric motor 1 that is configured in this manner, direct-current power is supplied to the DC-AC power converting portion from an external electric power supply. The controlling circuit that mounted to the control circuit board 17 controls the DC-AC power converting portion such that direct-current power is converted to alternating-current power, and is supplied to the stator winding 14 by means of the connecting terminals 25. The rotor 7 rotates due to electromagnetic effects on the permanent magnets 10 of the rotor 7. The torque therefrom is transmitted to an electric power steering apparatus (not shown) by means of the shaft 8 and the boss portion 19, such that the electric power steering apparatus is driven.

According to Embodiment 1, coil terminals 26 of concentrated winding coils 14*a* extend outward from concentrated winding coils 14*a*, are led around circumferentially through grooves 21*a*, and are connected to first terminal portions 25*a* of connecting terminals 25 that are subject to connection therewith. These coil terminals 26 are portions of conductor wires that are made of jointless continuous copper wire that is coated using an enamel resin, in other words, the concentrated winding coils 14*a* themselves. Thus, it is not necessary to dispose current-carrying members that are separate members from the concentrated winding coils 14*a* inside the grooves 21*a* of the holder portion 21, as it was in Patent Literature 1, thereby enabling reductions in cost to be achieved. Furthermore, the portions of the coil terminals 26 that are led around circumferentially are housed and held inside the grooves 21*a*. Thus, it is not necessary to fix the portions of the coil terminals 26 that are led around circumferentially by gluing to the coil ends as it was in Patent Literature 2, increasing productivity.

Notches 21*b* are formed on the holder portion 21 so as to communicate radially between the grooves 21*a* and external portions of the holder portion 21, and the coil terminals 26 that extend outward from the concentrated winding coils 14*a* are led through the notches 21b into the grooves 21a. Thus, pulling the coil terminals 26 into the grooves 21a is facilitated, improving workability when leading the coil terminals 26 around circumferentially.

Leg portions 22 that include fixing hooks 22a on protruding ends are formed on the holder portion 21, securing apertures 15b are formed on insulators 15, and the holder 20 is mounted to the stator 11 using snap-fitting coupling of the fixing hooks 22a and the securing apertures 15b. Thus, because the holder 20 can be mounted to the stator 11 simply by pushing the leg portions 22 into the securing apertures 15b, assembly can be improved.

Moreover, in Embodiment 1 above, a case in which the present invention is applied to an electric motor has been explained, but similar effects are also exhibited when the present invention is applied to other rotary electric machines such as generators or generator-motors.

In Embodiment 1 above, the stator winding is configured by delta-connecting concentrated winding coils, but the stator winding may alternatively be configured by wye-connecting the concentrated winding coils.

In Embodiment 1 above, fixing hooks are fitted into securing apertures that are formed on insulators, but the securing portions are not limited to securing apertures, and may be securing grooves.

The invention claimed is:

1. A rotary electric machine comprising:
a rotor;
a stator that includes:
an annular stator core that is disposed so as to surround said rotor; and
a plurality of coils that are wound onto said stator core;
an insulating member that includes an annular holder portion in which a groove is formed on one surface so as to extend circumferentially, said insulating member being disposed on a first axial end of said stator such that a second surface of said holder portion is oriented toward said stator; and
a plurality of connecting terminals that are each held by one of a plurality of terminal holding portions disposed radially outside of the groove such that the terminal holding portions and the groove do not overlap as viewed in the axial direction, the terminal holding portion being a part of said insulating member; wherein the insulating member comprising a radially inner wall and radially outer wall, the terminal holding portions extend radially outside from the radially outer wall;
wherein coil terminals of said plurality of coils each extend outward from said coils, are led around circumferentially through said groove, and are connected to connecting terminals that are subject to connection therewith among said plurality of connecting terminals.

2. The rotary electric machine according to claim 1, wherein a notch is formed on said holder portion so as to communicate radially between said groove and an external portion of said holder portion, and said coil terminals that extend outward from said coils are led into said groove through said notch.

3. The rotary electric machine according to claim 2, wherein:
said stator core is constituted by core blocks in which a tooth portion protrudes radially inward from an inner circumferential wall surface of an circular arc-shaped core back portion, said core blocks being arranged into an annular shape such that circumferential side surfaces of said core back portions are butted against each other;
said coils are configured by winding a conductor wire around said tooth portion and insulators that are disposed on first and second axial end surfaces of said core blocks;
a securing portion is formed on said insulators that are disposed on said first axial end surfaces of said core blocks; and
said insulating member includes a leg portion that comprises a fixing hook on a protruding end that protrudes outward from said holder portion toward a second axial end, said insulating member being disposed on said first axial end of said stator by fitting said fixing hook into said securing portion.

4. The rotary electric machine according to claim 1, wherein:
said stator core is constituted by core blocks in which a tooth portion protrudes radially inward from an inner circumferential wall surface of an circular arc-shaped core back portion, said core blocks being arranged into an annular shape such that circumferential side surfaces of said core back portions are butted against each other;
said coils are configured by winding a conductor wire around said tooth portion and insulators that are disposed on first and second axial end surfaces of said core blocks;
a securing portion is formed on said insulators that are disposed on said first axial end surfaces of said core blocks; and
said insulating member includes a leg portion that comprises a fixing hook on a protruding end that protrudes outward from said holder portion toward a second axial end, said insulating member being disposed on said first axial end of said stator by fitting said fixing hook into said securing portion.

5. The rotary electric machine according to claim 1, wherein the plurality of connecting terminals comprises three connecting terminals which are disposed circumferentially at a pitch of 90 degrees.

* * * * *